(12) United States Patent
Tsuji et al.

(10) Patent No.: US 11,275,780 B2
(45) Date of Patent: Mar. 15, 2022

(54) IMAGE SEARCH DEVICE, IMAGE SEARCH METHOD, ELECTRONIC DEVICE AND CONTROL METHOD THEREFOR

(71) Applicant: OMRON Corporation, Kyoto (JP)

(72) Inventors: Ayana Tsuji, Kusatsu (JP); Kiyoaki Tanaka, Otsu (JP); Takahiro Takayama, Kusatsu (JP); Lizhou Zhang, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 16/970,977

(22) PCT Filed: Jan. 23, 2019

(86) PCT No.: PCT/JP2019/002143
§ 371 (c)(1),
(2) Date: Aug. 19, 2020

(87) PCT Pub. No.: WO2019/171803
PCT Pub. Date: Sep. 12, 2019

(65) Prior Publication Data
US 2020/0401616 A1    Dec. 24, 2020

(30) Foreign Application Priority Data
Mar. 9, 2018    (JP) .............................. JP2018-042761

(51) Int. Cl.
*G06F 16/532*    (2019.01)
*G06F 16/583*    (2019.01)
*G06F 16/538*    (2019.01)

(52) U.S. Cl.
CPC .......... *G06F 16/532* (2019.01); *G06F 16/538* (2019.01); *G06F 16/583* (2019.01)

(58) Field of Classification Search
CPC ..... G06F 16/532; G06F 16/583; G06F 16/538
(Continued)

(56) References Cited

U.S. PATENT DOCUMENTS

| 9,087,059 B2 * | 7/2015 | Petrou .................. G06F 16/438 |
| 2013/0051670 A1 * | 2/2013 | Das ..................... G06F 16/4393 382/170 |

(Continued)

FOREIGN PATENT DOCUMENTS

| JP | 2008-33755 A | 2/2008 |
| JP | 2009-294767 A | 12/2009 |

(Continued)

OTHER PUBLICATIONS

Kentaro Adachi et al. "Comparison of Recommendation Algorithms for Suggested Pins on Pinterest", Nov. 17, 2015, pp. 205-212, IPSJ Symposium on Web and Databases (WebDB Forum); Relevance is indicated in the (translated) ISR dated Apr. 2, 2019.

(Continued)

*Primary Examiner* — Kimberly L Wilson
(74) *Attorney, Agent, or Firm* — Metrolex IP Law Group, PLLC (57) ABSTRACT

An image search device receives an image search request and selects, from a plurality of images, a first group of images that match search conditions based on the search request. The image search device further selects, from the first group of images, a second group of images based on a score calculated by a predetermined evaluation formula, and outputs information about the second group of images as a search result. The predetermined evaluation criteria may be set so as to increase the score for an image in the first group of images based on positive engagement by many people on (Continued)

the predetermined internet service and based on the extent that the image is less similar to other images in the first group of images.

19 Claims, 9 Drawing Sheets

(58) Field of Classification Search
USPC .......................................................... 707/768
See application file for complete search history.

(56) References Cited

U.S. PATENT DOCUMENTS

| | | | | |
|---|---|---|---|---|
| 2015/0331929 | A1* | 11/2015 | El-Saban | ............ G06F 16/9024 707/739 |
| 2015/0379116 | A1 | 12/2015 | Houjou | |
| 2019/0095465 | A1* | 3/2019 | Zhai | ...................... G06F 16/532 |

FOREIGN PATENT DOCUMENTS

| | | |
|---|---|---|
| JP | 2012-205130 A | 10/2012 |
| JP | 2012-242878 A | 12/2012 |
| JP | 2013-196200 A | 9/2013 |
| JP | 2017-204169 A | 11/2017 |
| JP | 2018-25994 A | 2/2018 |

OTHER PUBLICATIONS

An English translation of the International Search Report ("ISR") of PCT/JP2019/002143 dated Apr. 2, 2019.
The Written Opinion("WO") of PCT/JP2019/002143 dated Apr. 2, 2019.

* cited by examiner

Category: Temple

| Rank | Image Name | File/URI | Score | SNS Metric | Dissimilarity |
|---|---|---|---|---|---|
| 1 | kiyomizu | img00.jpg | 95 | 1250 | 81 |
| 2 | todaiji | http://img.com/img1.jpg | 92 | 807 | 98 |
| 3 | horyuji | image_a.jpg | 88 | 1365 | 71 |
| ⋮ | ⋮ | ⋮ | ⋮ | ⋮ | ⋮ |

Category: Waikiki Beach, Hawaii

| Rank | Image Name | File/URI | Score | SNS Metric | Dissimilarity |
|---|---|---|---|---|---|
| 1 | hawaii | img662.jpg | 83 | 2041 | 83 |
| 2 | beach | waikiki-beach05.jpg | 82 | 2325 | 66 |
| 3 | waikiki | ftp://ftp.jp/waikiki.jpg | 77 | 1820 | 78 |
| ⋮ | ⋮ | ⋮ | ⋮ | ⋮ | ⋮ |

IMAGE SEARCH DEVICE, IMAGE SEARCH METHOD, ELECTRONIC DEVICE AND CONTROL METHOD THEREFOR

TECHNICAL FIELD

The present invention relates to an image search technology.

BACKGROUND

The spread of smartphones and the advent of social networking services (SNS) have made it easier and simpler to publish personally shot images on the network and share the images with others. This type of service allows a person to not only publish their own images but to also browse images taken by others and search for desired images. For example, a person can use SNS to search and browse images of a travel destination or a popular spot as references for a composition or an angle when taking their own photographs at that location.

A typical SNS offers a keyword-based image search (hashtag search) and orders search results by popularity (so-called "most likes"). Further, Patent Document 1 proposes a system that allows users to efficiently browse popular images. The system classifies images posted on SNS that have a large number of accesses (views) into a specific category to improve the efficiency of image browsing on the SNS.

RELATED ART

Patent Documents

[Patent Document 1] Japanese Patent Publication No. 2013-196200

SUMMARY

Technical Problem

A method of simply retrieving popular images as a search result, as does the above-described conventional image search, tends to output many photographs taken with a similar composition and angle. While those kinds of search results are still helpful for users wishing to take photos with a standard composition or angle, the search results are not so helpful or inspiring for users who wish to take photos with a unique or unexpected touch. Many active SNS users desire to do the same things others do and take photos while doing so, e.g., going to popular spots and experiencing much-talked-about things; nevertheless, they also wish to take photos that can draw attention and be appreciated by others (i.e., "social media worthy pictures"). Conventional methods of image searching cannot satisfy such desires.

With the foregoing circumstances in mind, the present invention aims to provide a technology capable of providing a unique image example as a search result.

Solution to Problem

A first aspect of the present invention provides an image search device including a search request receiving means for receiving an image search request from a user, a first selection means for selecting from a plurality of images a first group of images that matches a search condition that is based on the search request, a second selection means for selecting from the first group of images a second group of images on the basis of a score calculated by a predetermined evaluation formula, and a result output means for outputting information about the second group of images as a search result, wherein each of the plurality of images is an image subjected to possible evaluative engagement by any person on a predetermined internet service, and the predetermined evaluation formula is designed to increase the score for an image in the first group of images to the extent of positive engagement by many people on the predetermined internet service and increase the score to the extent that the image is less similar to other images in the first group of images.

This configuration provides, from within a group of images matching the search condition, the images that are well liked by others and richly varied with non-conventional compositions or angles as a search result. Thus, the user can refer to the image provided by the search to take an image that may be more eye-catching and likable by others.

The first aspect of the present invention may further include a selection information receiving means for receiving information of a selected image in response to the user selecting the image from the second group of images, and a third selection means for selecting from the first group of images a third group of images similar to the selected image, and the result output means may output information about the third group of images as a second search result. The user can refer to the third group of images for compositions and angles when taking a picture.

The first aspect of the present invention may further include a database that pre-categorizes and stores the plurality of images or the locator information thereof, the search condition may include information indicating the category, and the first selection means may select from the database a group of images belonging to a category that matches the search condition as the first group of images. Pre-categorizing images in this way provides a first level of filtering for the images and allows for a speedier search process.

The database may pre-rank, per category, groups of images belonging to the category on the basis of the score, and the second selection means may select a predetermined number of top-ranked images from the first group of images as the second group of images. Pre-ranking images in this way allows for a speedier search process.

The search request may include an input image entered by a user, and the search request receiving means may be configured to recognize an element in the input image and determine the search condition on the basis of the element recognized. According to this configuration, the user submits an image taken by themselves or a preview image created before their actual shooting as an input image and obtains an image having a common element with the input image as a search result, to be used as a convenient reference when the user takes an image.

The search request may include location information entered by the user, and the search request receiving means may determine the search condition on the basis of the location information. According to this configuration, if the information on the user's current position or the like is submitted as location information, the user obtains an image that can be taken from their current position as a search result, to be used as a convenient reference when the user takes an image.

A second aspect of the present invention provides an electronic device connected to the above-described image search device via a network; and the electronic device includes a transmitting means for sending an image search request to the image search device, a receiving means for receiving a search result for the search request from the image search device, and a display control means for displaying the second group of images on a display device on the basis of the search result received.

A third aspect of the present invention provides an electronic device connected via a network to the above-described image search device. The electronic device includes a transmitting means for sending an image search request to the image search device, a receiving means for receiving a search result for the search request from the image search device, a display control means for displaying the second group of images on a display device on the basis of the search result received, and a selection instruction receiving means for receiving a selection instruction from the user to select one image from the second group of images. When the selection instruction receiving means receives a selection instruction, the transmitting means sends information about a selected image to the image search device, the receiving means receives the second search result from the image search device, and the display control means displays the third group of images similar to the selected image on a display device on the basis of the second search result received.

A fourth aspect of the present invention provides an electronic device connected via a network to the above-described image search device. The electronic device includes an imaging means, a transmitting means for sending a search request containing an image taken by the imaging means as the input image to the image search device, a receiving means for receiving a search result for the search request from the image search device, and a display control means for displaying the second group of images on a display device on the basis of the search result received.

The transmitting means may be configured to send a preview image taken by the imaging means to the image search device as the input image, and the display control means may be configured to display the second group of images on the display device along the preview image.

A fourth aspect of the present invention may further include a processing means for processing an image taken by the imaging means while or after the second group of images is displayed to lower the similarity thereof with the second group of images.

A fifth aspect of the present invention provides an electronic device connected via a network to the above-described image search device. The electronic device includes a position detection means, a transmitting means for sending a search request containing current location information detected by the position detection means as the location information to the image search device, a receiving means for receiving a search result for the search request from the image search device, and a display control means for displaying the second group of images on a display device on the basis of the search result received.

A sixth aspect of the present invention provides an image search method including steps of receiving an image search request from a user, selecting from a plurality of images a first group of images that matches a search condition that is based on the search request, selecting a second group of images from the first group of images on the basis of a score calculated by a predetermined evaluation formula, and outputting information about the second group of images as a search result; each of the plurality of images is an image subjected to possible evaluative engagement by any person on a predetermined internet service, and the predetermined evaluation formula designed to increase the score for an image in the first group of images to the extent of positive engagement by many people on the predetermined internet service and increase the score to the extent that the image is less similar to other images in the first group of images.

A seventh aspect of the present invention provides a program for a computer to execute each step of the image search method described above.

An eighth aspect of the present invention provides a control method for an electronic device connected via a network to the above-described image search device. The control method includes steps of sending an image search request to the image search device, receiving a search result for the search request from the image search device, and displaying the second group of images on the basis of the search result received.

A ninth aspect of the present invention provides a control method for an electronic device connected via a network to the above-described image search device. The method includes steps of sending an image search request to the image search device, receiving a search result for the search request from the image search device, displaying the second group of images on the basis of the received search result, and receiving a selection instruction from the user to select one image from the second group of images, sending information about the selected image to the image search device when said selection instruction is received, receiving the second search result from the image search device, and displaying the third group of images similar to the selected image on the basis of the second search result received.

A tenth aspect of the present invention provides a control method for an electronic device connected via a network to the above-described image search device. The control method includes steps of taking an image, sending a search request containing the image taken as an input image to the image search device, receiving a search result for the search request from the image search device, and displaying the second group of images on the basis of the search result received.

An eleventh aspect of the present invention provides a control method for an electronic device connected via a network to the above-described image search device. The control method includes steps of detecting current location information, sending a search request containing the current location information detected as the location information to the image search device, receiving a search result for the search request from the image search device, and displaying the second group of images on the basis of the search result received.

A twelfth aspect of the present invention provides a program for a computer to execute each step of the control method for an electronic device described above.

Effects

The present invention allows a unique image example to be provided as a search result.

DETAILED DESCRIPTION

Example Application

Figure 1:
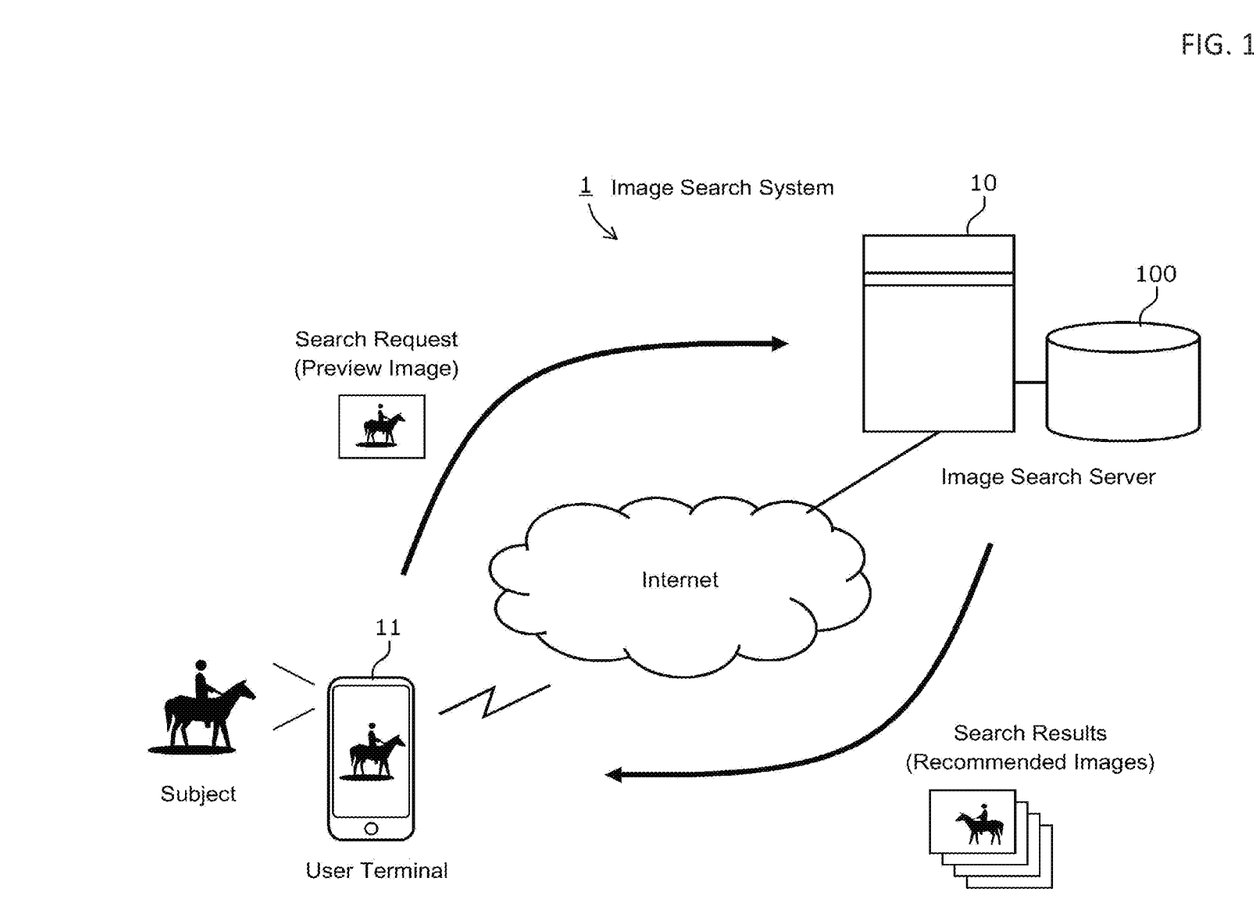
FIG. 1 is a diagram illustrating an overall image of an image search service using an image search system according to an embodiment of the present invention.

First, an example of a situation to which the present invention is applied is described. FIG. 1 is a diagram illustrating an overall image of an image search service using an image search system according to an embodiment of the present invention.

The image search system 1 is roughly composed of an image search server (image search device) 10 that provides an image search service, and a user terminal (electronic device) 11 used by a user of the service. FIG. 1 only depicts a single image search server 10 and a single user terminal 11, but in reality, the system may have a redundant configuration with a plurality of image search servers 10, and the service may be used by a plurality of the user terminals 11.

The image search server 10 is a server that provides an internet service that searches for an image on the basis of a search request received from a user and returns the search result to the user. The image search server 10 includes an image database 100 that stores a plurality of images. Note that the image database 100 may be configured to store image locator information (e.g., Uniform Resource Identifier (URI)) instead of the image itself (actual image data). That is, the image search server 10 may be configured to search for not only image data stored on and managed by the server, but also image data stored on other servers and image data provided by other services (such as an SNS).

The user terminal 11 is an electronic device possessed and operated by a user who uses the image search service. While a client program may have any function and/or specifications for using the image search service, the present example application features a program that assists a user in taking a photo (hereinafter, referred to as an "imaging assistant application").

First, the user launches the imaging assistant application on the user terminal 11. Then, the user terminal 11 (more specifically, a central processing unit (CPU) that executes an instruction of the imaging assistant application) acquires an image from the imaging device and displays a preview image thereof on the screen of the user terminal 11. The user terminal 11 in turn sends the preview image along a search request to the image search server 10.

The image search server 10 analyzes the image received from the user terminal 11 to recognize an element photographed therein, and determines an image search condition on the basis of a recognition result. For example, the image search server 10 may perform person recognition, general object recognition, scene analysis, and the like to recognize an element such as a person, an object, a landscape, and/or a place in an image. Using a recognition result, a search condition (a search keyword) such as "woman," "couple," "car," "Tokyo Skytree," "Mt. Fuji," "Hawaii," and "Leaning Tower of Pisa" can be generated. Next, the image search server 10 selects an image that matches the search condition from the image database 100 (a first selection), and then selects from the group of selected images (a first group of images) several images that are well liked on SNS, etc. and dissimilar to other images in the same category (a second selection). Then, the image search server 10 provides the user terminal 11 with information about the several selected images (a second group of images) as a search result.

The user terminal 11 displays a group of images received as a search result from the image search server 10 as recommended images on the screen (at this time, the recommended images may be displayed in a manner that allows comparison with the preview image). The recommended images are images that meet the conditions of having a common element with the subject the user is about to take a picture of, having received a positive engagement on SNS, etc. and featuring a unique composition and/or angle. The user can thus refer to recommended images displayed on the screen to take a potentially unique image that can be positively engaged on SNS.

Image Search System

Figure 2:
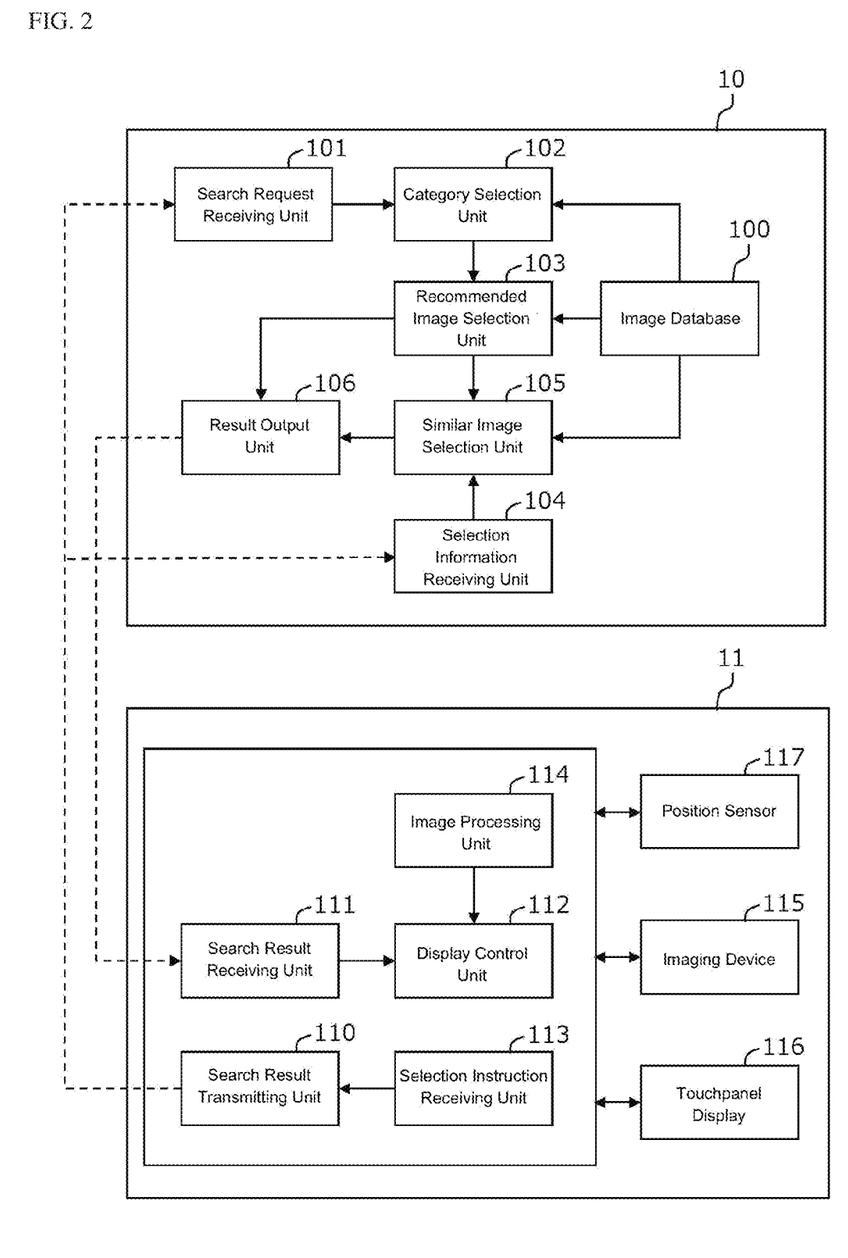
FIG. 2 is a diagram detailing the configuration of the image search system.

Next, a specific configuration of the image search system 1 according to the present embodiment is described with reference to FIG. 2.

Image Search Server

The image search server 10 includes an image database 100, a search request receiving unit (a search request receiving means) 101, a category selection unit (a first selection means) 102, a recommended image selection unit (a second selection means) 103, selection information receiving unit (a selection information receiving means) 104, a similar image selection unit (a third selection means) 105, and a result output unit (a result output means) 106.

The image database 100 is a database that categorizes and stores a plurality of images or locator information thereof. The search request receiving unit 101 receives a search request from the user terminal 11. The category selection unit 102 identifies a category that matches a search condition and selects, from a plurality of images stored in the image database 100, a group of images belonging to the category as the first group of images. The recommended image selection unit 103 selects several images (a second group of images) having high scores calculated by a predetermined evaluation formula from the first group of images. The second group of images is output to the user terminal 11 as a search result and displayed as recommended images on the screen of the user terminal 11. In response to the user selecting one image from the group of recommended images, the selection information receiving unit 104 receives information about the selected image. The similar image selection unit 105 selects a group of images (a third group of images) similar to the selected image from the first group of images. The result output unit 106 sends the selection result of the recommended image selection unit 103 and the selection result of the similar image selection unit 105 to the user terminal 11.

The image search server 10 may be configured, for example, by installing necessary programs (an operating system, a database management program, an image search program, etc.) on a general-purpose server computer including at least a CPU (a processor), a memory, a large-capacity storage, a communication device, and an input device. In this configuration, blocks 100 through 106 shown in FIG. 2 are realized by the CPU loading a program stored in the storage into the memory and running the program. However, the configuration of the image search server 10 is not limited hereto. For example, some or all of the functions provided by the image search server 10 may be realized by dedicated hardware such as an Application Specific Integrated Circuit (ASIC) or a Field Programmable Gate Array (FPGA). The image search server 10 may be composed of a single computer or a plurality of computers.

User Terminal

The user terminal 11 includes a search request transmitting unit (a transmitting means) 110, a search result receiving unit (a receiving means) 111, a display control unit (a display control means) 112, a selection instruction receiving unit (a selection instruction receiving means) 113, and an image processing unit (a processing means) 114. The user terminal 11 also includes, as hardware, an imaging device (an imaging means) 115, a touch panel display (a display device and input device) 116, and a position sensor (a position detection means) 117.

The search request transmitting unit 110 sends a search request to the image search server 10. The search result receiving unit 111 receives a search result for the search request from the image search server 10. The display control unit 112 controls the display of a preview image, a search result image, and the like on the touch panel display 116. The selection instruction receiving unit 113 receives a selection instruction from the user to select one image from the recommended images displayed as a search result. The image processing unit 114 processes an image taken by the imaging device 115.

The imaging device 115 is a camera capable of taking still images and videos. The touch panel display 116 is a device that functions as both a display device and an input device, and may be served, for example, by a liquid crystal display, an organic electroluminescent (EL) display or the like. The position sensor 117 is a device that detects current location information of the user terminal 11 and may be served, for example, by a GPS sensor. The user terminal 11 further includes a CPU (a processor), a memory, and a storage (not shown). Blocks 110 through 114 illustrated in FIG. 2 are realized by the CPU loading a program (an operating program, an imaging assistant application, and the like) stored in the storage into the memory and running the program. However, the configuration of the user terminal 11 is not limited hereto. For example, some or all of the functions provided by the user terminal 11 may be realized by dedicated hardware such as an ASIC or an FPGA. Further, some of the functions of the user terminal 11 may be executed by a cloud server.

Image Database

Figure 3:
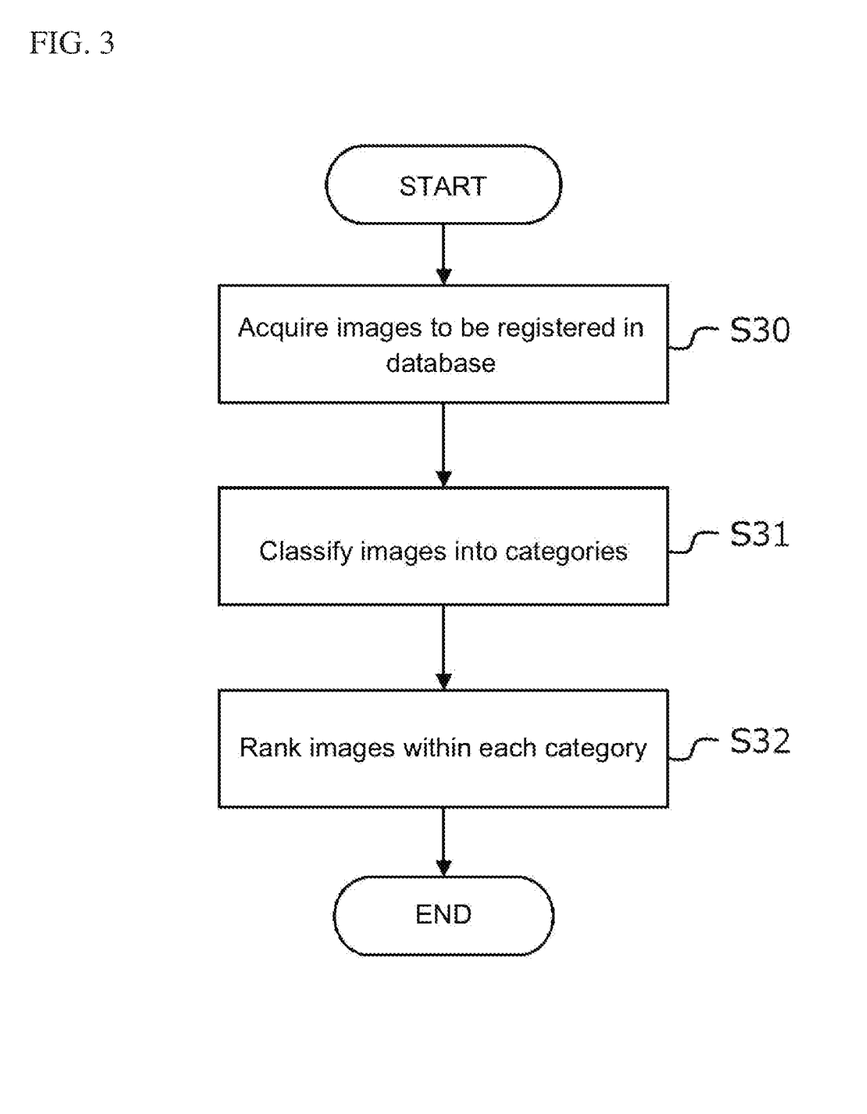
FIG. 3 is a flowchart illustrating the flow of creating entries in an image database.
Figure 4:
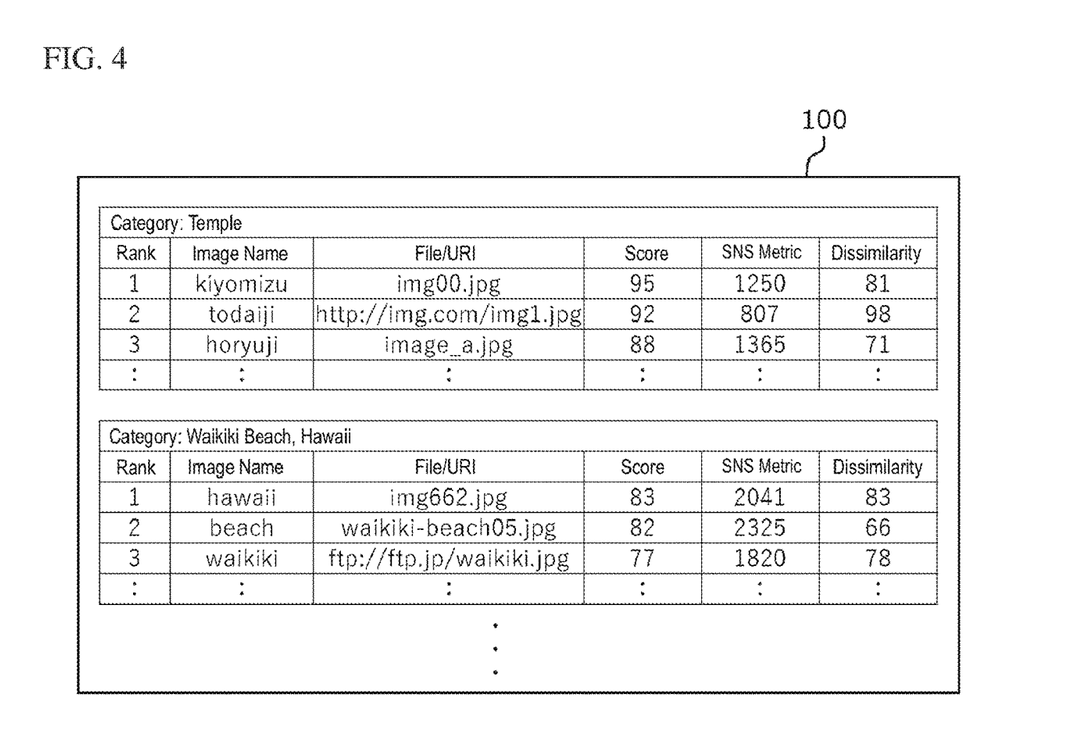
FIG. 4 is a diagram illustrating an example of an image database structure.

The structure of the image database 100 and how it creates data entries are described with reference to FIGS. 3 and 4. FIG. 3 is a flowchart illustrating a process of data entry creation in the image database 100, and FIG. 4 is a diagram illustrating a structure of the image database 100.

In step S30, the image search server 10 obtains data of a plurality of images to be registered in the image database 100. The image may be obtained from any source. For example, assume here that an image is obtained from an SNS server provided by the same company that provides the image search service. Assume that on this SNS, members can freely publish images taken by themselves, and can also view and engage with images published by others (giving "likes" and posting "comments"); further, members can post images on the SNS with metadata such as hashtags and location information.

In a step S31, the image search server 10 categorizes each image. Specifically, the image search server 10 performs various analytical processes including person recognition, general object recognition, scene analysis, and the like to recognize an element (a person, an object, a place, etc.) in an image. As this type of analytical processing can employ, for example, a convolutional neural network (CNN) and other known algorithms, a detailed description thereof is omitted here. Along with image analysis, the image search server 10 can also infer an element in an image from the metadata (hashtag, location information, etc.) added to the image. The image search server 10 then determines the category of the image on the basis of the element in the image. For example, the following categories are assumed.

Attribute of the subject (person): "woman," "couple," "baby," "businessman," etc.
  Subject (general object): "car," "mountain," "cherry blossom," "Ferris wheel," "temple," etc.
  Subject (entity): "Mt. Fuji," "Tokyo Skytree," "Kiyomizu Temple," "Leaning Tower of Pisa," etc.
  Landscape: "beach," "skyscrapers," "sunset," "blue sky," etc.
  Location: "Waikiki Beach, Hawaii," "Higashi Honganji, Kyoto," etc.

Note that the categorization of images is not limited to the above, and may be freely designed. In addition, one image may be registered with a plurality of categories (e.g., an image of a couple taken at Waikiki Beach may be registered with four categories: "couple," "beach," "blue sky," and "Waikiki Beach, Hawaii").

In a step S32, the image search server 10 ranks images by category. Specifically, images in a category are ranked according to a score given to each image by an evaluation formula designed to increase the score for an image to the extent of positive engagement by many people on the above-described SNS and increase the score to the extent that the image is less similar to other images in the same category. An example of the evaluation formula is described below.

$$Y_{ci} = \alpha \times E_i + \beta \times S_{ci},$$

where
$Y_{ci}$ refers to a score of an image i in a category c,
$E_i$ refers to a degree of positive engagement the image i has received on SNS,
$S_{ci}$ refers to lack of similarity (dissimilarity) between the image i and other images in the category c, and
$\alpha$, $\beta$ refer to weighting factors.

The degree of positive engagement $E_i$ represents, for example, the number of "likes" the image i has received. Alternatively, it may be the number of positive comments the image i has received. Whether a comment is positive or not may be determined, for example, by the use of natural language processing.

The lack of similarity $S_{ci}$ can be calculated, for example, by the following formula:

$$S_{ci} = \Sigma s_{ij},$$

where
$s_{ij}$ refers to the lack of similarity between an image i and an image j, and
$j \in c$ (however, $i \neq j$).

Any algorithm may be used to calculate the similarity. For example, similarity is demonstrated [evaluated? Rated?]

through comparisons of feature values (color, brightness, etc.), scenes, subjects' postures and poses, image processing methods (a filter, a stamp, etc.) and the like.

FIG. 4 shows an example of the structure of the image database 100. A plurality of images is classified into categories, and ranked on the basis of the above-described score Y within each category. Note that, in the example of FIG. 4, the database also stores the degree of positive engagement E and the lack of similarity (dissimilarity) S of each image on the SNS. Further, some of the registered images in the image database 100 have their actual image data registered while others have only the URI indicating the location thereof registered.

Image Search Service

Figure 5:
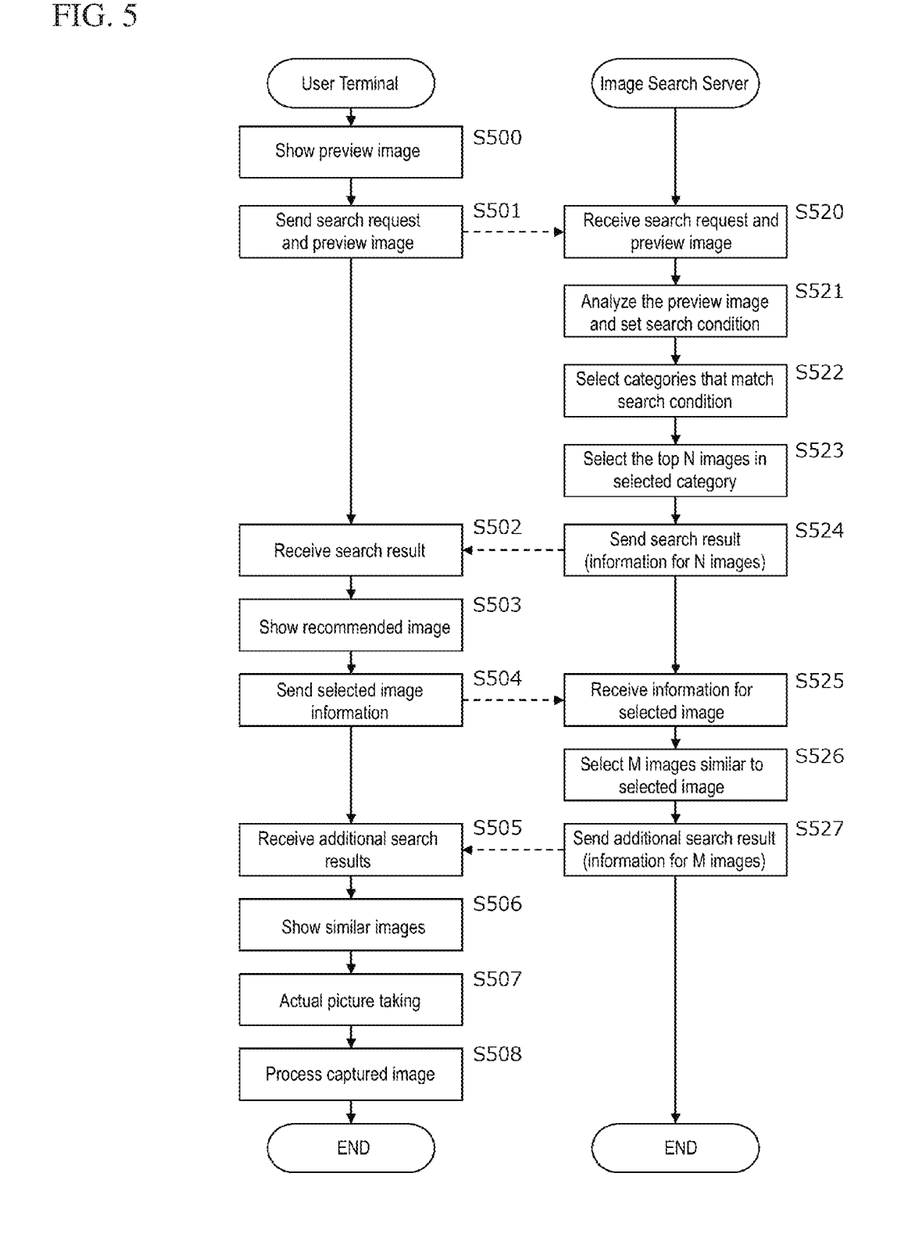
FIG. 5 is a diagram illustrating processes at an image search server and a user terminal.
Figure 6:
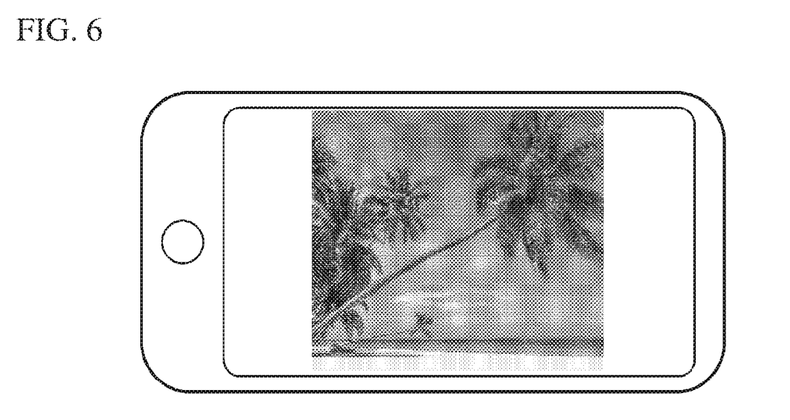
FIG. 6 is a display example of a preview image on a user terminal.
Figure 7A:
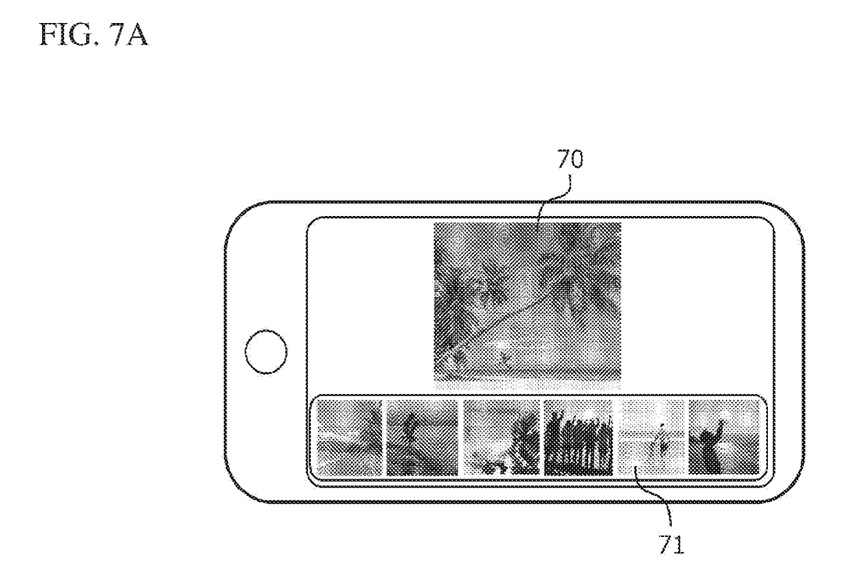
FIG. 7A and FIG. 7B are display examples of recommended images on a user terminal.
Figure 7B:
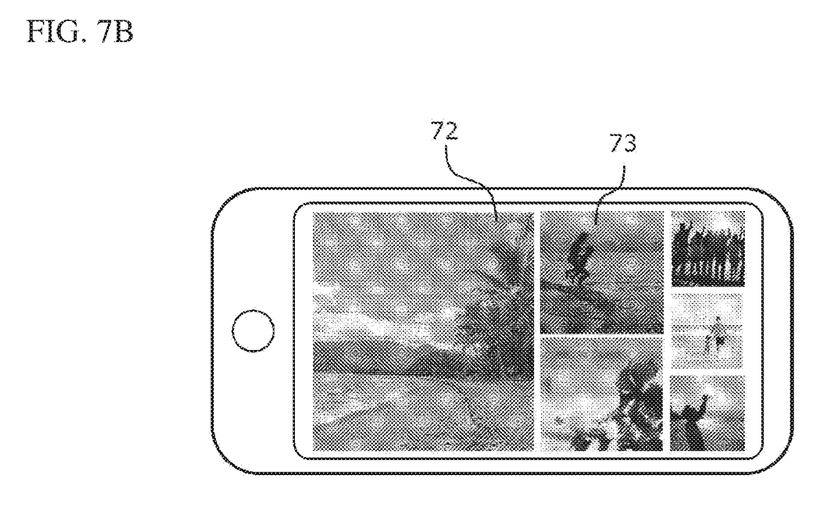
Figure 8:
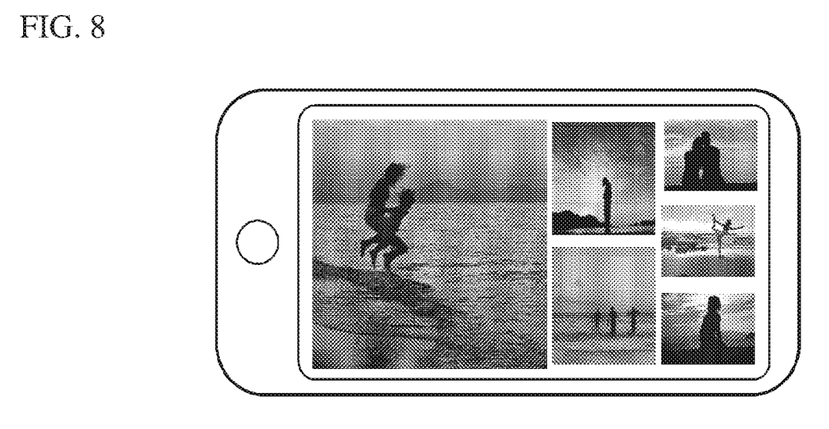
FIG. 8 is a display example of similar images on a user terminal.

Next, imaging assistance using the image search service provided by the image search system 1 is described in detail with reference to FIG. 5 to FIG. 8. FIG. 5 is a diagram illustrating respective processes of the image search server 10 and the user terminal 11; FIG. 6 is a display example of a preview image on the user terminal; FIG. 7A and FIG. 7B are display examples of recommended images; and FIG. 8 is a display example of similar images.

In a step S500, upon the launch of the imaging assistant application on the user terminal 11, the display control unit 112 acquires an image from the imaging device 115 and displays a preview image thereof on the touch panel display 116. Note that the image acquisition and the preview image display are repeated at a predetermined time interval such as 10 frames/second (fps) and 30 fps. FIG. 6 is an example of a preview image displayed on a screen of a smartphone serving as the user terminal 11.

Here, when the user instructs to "show a recommended image" in the imaging assistant application, the search request transmitting unit 110 sends a preview image along a search request to the image search server 10 (a step S501). In this example, the search request is sent in accordance with the user's instruction, but the search request may be automatically sent without the user's instruction. For example, a search request may be sent each time a preview image is acquired from the imaging device 115, or at a predetermined time interval such as once per second to reduce the processing load. Alternatively, in order to further reduce the processing load, the search request may be sent only when a content (a subject, a composition, an angle, etc.) of the preview image has substantially changed. A change in the content of the preview image may be evaluated, for example, by simple differences of the image, or by the change in an image feature value (color, brightness, etc.), or by other methods.

In a step S520, the search request receiving unit 101 of the image search server 10 receives the search request and the preview image from the user terminal 11. Then, in a step S521, the search request receiving unit 101 performs various analytical processes such as person recognition, general object recognition, and scene analysis on the preview image, and thereby recognizes an element (a person, an object, landscape, place, etc.) in the preview image. A detailed description of the processing is omitted because the same processing used to determine a category of an image in creating an entry in the image database 100 may be used here. The category information of the preview image obtained in the step S521 is used as a search condition for the next step. When a plurality of category candidates for the preview image is obtained in the step S521, a category identified by a proper name may be preferentially selected from the candidates as a search condition. For example, when "couple," "cherry blossoms," "temple," "Kiyomizu temple," and "blue sky" are obtained as category candidates, the category "Kiyomizu temple" may be set as a search condition. Selecting the search condition in this way increases the likelihood of returning an image highly relevant to the element shown in the preview image as a search result.

In a step S522, the category selection unit 102 selects a group of images belonging to a category that matches the search condition from the image database 100. Subsequently, the recommended image selection unit 103 selects N images ranked highest from the group of images belonging to the category selected in the step S522 (a step S523). N is an integer that is set arbitrarily, and in this example, N=6. Then, in a step S524, the result output unit 106 sends the information of the N images selected in the step S523 to the user terminal 11. At this time, the actual image data may be sent as is; alternatively, data of a lower-resolution version of the image or locator information of the image may be sent.

In a step S502, the search result receiving unit 111 of the user terminal 11 receives a search result (information of the N images) from the image search server 10. Then, the display control unit 112 displays the N images as recommended images on the touch panel display 116 (a step S503). FIGS. 7A and 7B are display examples of recommended images. FIG. 7A is an example in which a recommended image group 71 is displayed along the preview image 70; FIG. 7B is an example in which only a recommended image group 72 is displayed. Further, in the display example of FIG. 7B, an image having a higher score Y is displayed in a larger size. The user can refer to the recommended images as shown in FIGS. 7A and 7B for the composition and the angle when taking a picture.

Here, when the user touches one of the recommended images, the selection instruction receiving unit 113 determines the selected image, and the information about the selected image is sent from the search request transmitting unit 110 to the image search server 10 (a step S504). Then, the selection information receiving unit 104 of the image search server 10 receives the information about the selected image from the user terminal 11 (a step S525), and the similar image selection unit 105 selects M images highly similar to the selected image from the images in the category to which the selected image belongs (a step S526). M is an integer that is set arbitrarily, and in this example, M=6. Note that the similarity used here may be the same index as the similarity used in the creation of an entry in the image database 100, or may be a different index. Further, the index of similarity may be designated by the user. For example, by allowing the user to select a perspective of similarity such as similarity of a composition, a posture or pose of a person, and color or brightness, it is possible to provide the user with an image that is more likely to interest the user. The information about the M selected similar images is sent from the result output unit 106 to the user terminal 11 in a step S527.

In a step S505, the search result receiving unit 111 of the user terminal 11 receives an additional search result (information about the M similar images) from the image search server 10. Then, the display control unit 112 displays the M similar images on the touch panel display 116 (a step S506). FIG. 8 is an example of similar images displayed when an image 73 of FIG. 7B is selected. The user can refer to a similar image as shown in FIG. 8 for the composition and the angle when the user takes an image.

In a step S507, when the user presses a shutter release button, an image is taken, and the image acquired by the imaging device 115 is stored in a storage. At this time, if a "processing setting" of the imaging assistant application is enabled, the image processing unit 114 performs a predetermined processing on the image acquired by the imaging device 115 (a step S508). This processing may involve any process that can reduce similarity between the image taken and the recommended image. For example, a filtering process and a decoration process such as stamping may be used.

The above-described imaging assistant application allows the user to refer to a recommended image displayed on the screen to take a potentially unique image that can be positively engaged on SNS.

Other

The above-described embodiment is merely an example for explaining a configuration of the present invention. The present invention is not limited to the above-described embodiment; various modifications may be made within the scope of the technical idea thereof. For example, in the above-described embodiment, an example of using an imaging assistant application for an image search service has been described, but the application of the present invention is not limited hereto.

Postscript 1

An image search device (10) includes a search request receiving means (101) for receiving an image search request from a user,
a first selection means (102) for selecting a first group of images that matches a search condition that is based on the search request,
a second selection means (103) for selecting from the first group of images a second group of images on the basis of a score calculated by a predetermined evaluation formula, and
a result output means (106) for outputting information about the second group of images as a search result;
each of the plurality of images is an image subjected to possible evaluative engagement by any person on a predetermined internet service, and
the predetermined evaluation formula designed to increase the score for an image in the first group of images to the extent of positive engagement by many people on the predetermined internet service and increase the score to the extent that the image is less similar to other images in the first group of images.

Postscript 2

An electronic device (11) connected via a network to an image search device (10), the electronic device including a transmitting means (110) for sending an image search request to the image search device (10),
a receiving means (111) for receiving a search result for the search request from the image search device (10), and
a display control means (112) for displaying the second group of images on a display device (116) on the basis of the search result received.

REFERENCE NUMERALS

1: Image search system
10: Image search server
11: User terminal
100: Image database

The invention claimed is:

1. An image search device comprising a processor configured with a program to perform operations comprising:
   operation as a search request receiving unit for receiving an image search request;
   operation as a first selection unit for selecting from a plurality of images a first group of images that matches a search condition that is based on the image search request;
   operation as a second selection unit for selecting from the first group of images a second group of images on the basis of a score calculated by a predetermined evaluation formula; and
   operation as a result output unit for outputting information about the second group of images as a search result;
   wherein
   each of the plurality of images comprises an image capable of being subjected to evaluative engagement through a predetermined internet service; and
   the predetermined evaluation formula is configured to increase the score for an image in the first group of images based on: positive engagement through the predetermined internet service; and an extent that the image is less similar to other images in the first group of images belonging to a same category.

2. The image search device according to claim 1, wherein:
   the processor is configured with the program to perform operations further comprising:
   operation as a selection information receiving unit for receiving information of a selected image in response to a selection of the image from the second group of images; and
   operation as a third selection unit for selecting from the first group of images a third group of images similar to the selected image; and
   the result output unit outputs information about the third group of images as a second search result.

3. The image search device according to claim 1, further comprising a database that pre-categorizes and stores the plurality of images or locator information thereof; wherein:
   the search condition includes information indicating the category; and
   operation as the first selection unit comprises selecting from the database a group of images belonging to a category that matches the search condition as the first group of images.

4. The image search device according to claim 3, wherein the database pre-ranks, per category, groups of images belonging to the category on the basis of the scores, and
   operation as the second selection unit comprises selecting a predetermined number of top-ranked images from the first group of images as the second group of images.

5. The image search device according to claim 1, wherein the image search request comprises an input image, and
   operation as the search request receiving unit comprises recognizing an element in the input image and determines the search condition on the basis of the element recognized.

6. The image search device according to claim 1, wherein the image search request contains location information, and
   operation as the search request receiving unit comprises determining the search condition on the basis of the location information.

7. The image search device according to claim 1, further comprising an electronic device connected via a network, the electronic device comprising a second processor configured with a second program to perform operations comprising:
  operation as a transmitting unit for sending the image search request to the search request receiving unit of the image search device;
  operation as a receiving unit for receiving the search result for the image search request from the result output unit of the image search device; and
  operation as a display control unit for displaying the second group of images on a display device on the basis of the search result received.

8. The image search device according to claim 2, further comprising an electronic device connected via a network, the electronic device comprising a second processor configured with a second program to perform operations comprising:
  operation as a transmitting unit for sending the image search request to the search request receiving unit of the image search device;
  operation as a receiving unit for receiving the search result for the image search request from the result output unit of the image search device;
  operation as a display control unit for displaying the second group of images on a display device on the basis of the search result received; and
  operation as a selection instruction receiving unit for receiving a selection instruction to select one image from the second group of images; wherein
  when the selection instruction receiving unit receives a selection instruction, the second processor is configured with the second program to perform operations such that operation as: the transmitting unit comprises sending information about the selected image to the selection information receiving unit of the image search device; the receiving unit comprises receiving the second search result from the result output unit of the image search device, and the display control unit comprises displaying the third group of images similar to the selected image on a display device on the basis of the second search result received.

9. The image search device according to claim 5, further comprising an electronic device connected via a network, the electronic device comprising a second processor configured with a second program to perform operations comprising:
  operation as an imaging unit;
  operation as a transmitting unit for sending the image search request comprising the image taken by the imaging unit as the input image to the search request receiving unit of the image search device;
  operation as a receiving unit for receiving the search result for the image search request from the result output unit of the image search device; and
  operation as a display control unit for displaying the second group of images on a display device on the basis of the search result received.

10. The image search device according to claim 9, wherein the second processor is configured with the second program to perform operations such that:
  operation as the transmitting unit comprises sending a preview image taken by the imaging unit to the search request receiving unit of the image search device as the input image; and
  operation as the display control unit comprises displaying the second group of images on the display device along the preview image.

11. The image search device according to claim 9, wherein the second processor is configured with the second program to perform operations further comprising operation as a processing unit for processing the image taken by the imaging unit while or after the second group of images is displayed to lower the similarity thereof with the second group of images.

12. The image search device according to claim 6, further comprising an electronic device connected via a network, the electronic device comprising a second processor configured with a second program to perform operations comprising:
  operation as a position detection unit;
  operation as a transmitting unit for sending the image search request comprising current location information detected by the position detection unit as the location information to the search request receiving unit of the image search device;
  operation as a receiving unit for receiving the search result for the image search request from the result output unit of the image search device; and
  operation as a display control unit for displaying the second group of images on a display device on the basis of the search result received.

13. An image search method comprising:
  receiving an image search request;
  selecting from a plurality of images a first group of images that matches a search condition that is based on the image search request;
  selecting a second group of images from the first group of images on the basis of a score calculated by a predetermined evaluation formula; and
  outputting information about the second group of images as a search result; wherein
  each of the plurality of images comprises an image capable of being subjected to evaluative engagement through a predetermined internet service, and
  the predetermined evaluation formula is configured to increase the score for an image in the first group of images based on: of positive engagement through the predetermined internet service; and an extent that the image is less similar to other images in the first group of images belonging to a same category.

14. A non-transitory computer readable storage medium storing a program for causing a computer to execute the image search method according to claim 13.

15. A control method for an electronic device connected via a network to the image search device according to claim 1 the control method comprising:
  sending the image search request to the search request receiving unit of the image search device;
  receiving the search result for the image search request from the result output unit of the image search device; and
  displaying the second group of images on the basis of the search result received.

16. A control method for an electronic device connected via a network to an image search device according to claim 2, the control method comprising:
  sending the image search request to the search request receiving unit of the image search device;
  receiving the search result for the image search request from the result output unit of the image search device;
  displaying the second group of images on the basis of the search result received;
  receiving a selection instruction to select one image from the second group of images;

sending information about the selected image to the selection information receiving unit of the image search device when said selection instruction is received;

receiving the second search result from the results output unit of the image search device; and displaying the third group of images similar to the selected image on the basis of the second search result received.

17. A control method for an electronic device connected via a network to an image search device according to claim 5, the control method comprising:

taking an image;

sending the image taken as the input image to the search request receiving unit of the image search device;

receiving the search result for the search request from the result output unit of the image search device; and displaying the second group of images on the basis of the search result received.

18. A control method for an electronic device connected via a network to an image search device according to claim 6, the control method comprising:

detecting current location information;

sending the current location information detected as the location information to the search request receiving unit of the image search device;

receiving the search result for the search request from the result output unit of the image search device; and displaying the second group of images one the basis of the search result received.

19. A non-transitory computer readable storage medium storing a program for causing a computer to execute the control method according to claim 15.

* * * * *